United States Patent
Shekleton et al.

[19]

[11] Patent Number: 6,065,281
[45] Date of Patent: May 23, 2000

[54] LIQUID FUEL INJECTOR AND INJECTOR SYSTEM FOR A SMALL GAS TURBINE ENGINE

[75] Inventors: Jack R. Shekleton; Curtis C. Martin, both of San Diego, Calif.

[73] Assignee: Capstone Turbine Corporation, Woodland Hills, Calif.

[21] Appl. No.: 09/357,523

[22] Filed: Jul. 19, 1999

Related U.S. Application Data

[62] Division of application No. 08/864,279, May 28, 1997, Pat. No. 5,966,926.

[51] Int. Cl.⁷ .................................................... F02C 7/232
[52] U.S. Cl. ........................................................ 60/39.094
[58] Field of Search ................................. 60/39.094, 734, 60/740, 741

[56] References Cited

U.S. PATENT DOCUMENTS

| | | | |
|---|---|---|---|
| 2,543,366 | 2/1951 | Haworth et al. | 60/39.094 |
| 2,595,759 | 5/1952 | Buckland et al. | 60/740 |
| 4,206,595 | 6/1980 | Cole | 60/39.094 |

*Primary Examiner*—Louis J. Casaregola
*Attorney, Agent, or Firm*—Albert J. Miller

[57] ABSTRACT

The liquid fuel injector includes continuous air assist with both the liquid fuel injector tube and the surrounding air assist tube constrained or reduced in diameter at the discharge ends thereof. The associated gas turbine engine compressor provides combustion air to the combustor and also air for continuous air assist with a separate air pump. The air assist air may be cooled in a heat exchanger either before or after the separate air pump. The liquid fuel injector may be mounted within an annular air blast tube and directed tangentially at the inner wall of the combustor.

A solenoid valve controlled purge line, together with solenoid valves in the liquid fuel and air assist lines can be utilized to purge any liquid fuel in the liquid fuel injector and manifold upon shutdown of the combustor. The liquid fuel injector can also be insulated and liquid fuel can be used to cool the fuel injector.

12 Claims, 7 Drawing Sheets

LIQUID FUEL INJECTOR AND INJECTOR SYSTEM FOR A SMALL GAS TURBINE ENGINE

This application is a division of application Ser. No. 08/864,279, filed May 28, 1997, now U.S. Pat. No. 5,966,426.

TECHNICAL FIELD

This invention relates to the general field of fuel injectors and more particularly to an improved liquid fuel injector and system for a small gas turbine engine.

BACKGROUND OF THE INVENTION

In a gas turbine engine, inlet air is continuously compressed, mixed with liquid fuel in an inflammable proportion, and then contacted with an ignition source to ignite the mixture which will then continue to burn. The heat energy thus released then flows in the combustion gases to a turbine where it is expanded and converted to rotary energy for driving equipment such an electrical generator. The combustion gases are then exhausted to atmosphere after giving up some of the remaining heat to the incoming air provided from the compressor.

As is well known, gas turbine engines typically include a rotor and a turbine wheel rotatable about a generally horizontal axis. Not infrequently, an annular combustor surrounds this horizontal axis and is provided with a plurality of angularly spaced liquid fuel injectors whereby liquid fuel is injected into the combustor to be ignited and burned and the combustion products ultimately directed at the turbine wheel to spin the turbine wheel. At a location that is usually external of the combustor, a ring-like manifold is utilized as a liquid fuel manifold to interconnect the various annularly spaced liquid fuel injectors.

Because the rotational axis of the compressor and turbine wheel is horizontal, this ring-like manifold would normally be in a vertical plane. This in turn means that the pressure acting on the liquid fuel at the lowermost liquid fuel injector will be greater than the pressure acting on the liquid fuel at the highest injector. The pressure difference is a consequence of gravity on the vertical column of liquid fuel in the manifold and thus is generally referred to as "manifold head".

While in a larger gas turbine this may not represent a significant problem, in a small gas turbine with nominally small liquid fuel flows, substantial nonuniformity in liquid fuel injection may be produced. This in turn can lead to the development of hot spots within the small gas turbine engine combustor which can shorten its life as well as reduce operating efficiencies because of poor localized combustion. Achieving uniform turbine inlet temperature distribution minimizes hot spots and cold spots to maximize efficiency of operation as well as to prolong the life of the turbine parts exposed to the hot combustion gases.

While a simple solution might be to provide a large number of liquid fuel injectors to insure that the liquid fuel is uniformly distributed to the combustion air, the number of liquid fuel injectors not only increase costs, but also means that each individual liquid fuel injector would be smaller when the overall liquid fuel consumption remains the same.

Also, while each liquid fuel injector can theoretically be provided with an individual orifice, this requires an increase in liquid fuel pressure in order to deliver liquid fuel past the orifice into the combustion chamber. As a consequence, in order to have substantially uniform liquid fuel injection at all injector locations, the manifold head pressure at the lowermost liquid fuel injector would be relatively small compared to the pressure applied to the liquid fuel at all other orifices. In order to increase this pressure drop at each liquid fuel injector location, the orifices must be made to be relatively small. As a consequence, these small orifices would be prone to clogging. Once an orifice is clogged and the corresponding liquid fuel orifice is blocked, the problem of hot spots returns.

The design of combustion systems for small gas turbines is hardly a simple scale down of designs that are operative in large gas turbine engines. Regardless of combustor size, there is a minimum residence time for liquid fuel and air within the combustor necessary to effect sufficiently complete combustion to generate the gases to drive a turbine wheel. Given the dynamics of gas flow in and out of a combustor to a turbine wheel, it should be readily apparent that as the size of the combustor is decreased, conventional techniques would only be starting the combustion process, if it occurred at all, as the air and liquid fuel mixture was exiting the combustor outlet.

Moreover, in small combustors, which necessarily are provided with small liquid fuel injectors and consequently have relatively small liquid fuel flow at each injector, it is difficult to provide the needed fine liquid fuel atomization with conventional techniques. This is primarily due to the fact that the small scale effects increased viscous losses resulting in a deterioration in liquid fuel atomization at the injector. In addition, the small liquid fuel metering orifices associated with such small liquid fuel injectors tend to promote premature liquid fuel spray deterioration due to orifice fouling which in turn can cause early engine failure due to gas temperature maldistributions. Conventional liquid fuel injector design techniques are already ordinarily complex and costly. When, however, they are employed to reduced scale design for use in small combustors, the complexity and cost becomes prohibitive.

Recognizing these difficulties, in recent years there has been a definite trend towards combustor systems in which the path of travel for the liquid fuel and air in the flame zone, as well as the products of combustion, are in the circumferential direction rather than in the axial direction as in a conventional combustion system. These annular combustors employ a technique called "sidewinding" to minimize the axial flow components of liquid fuel, air and products of combustion. This arrangement maximizes the time available for combustion within a given small volume and also permits a significant reduction in the number of liquid fuel injectors without the resultant undesirable high turbine inlet temperature maldistributions as would be obtained using conventional design techniques if the number of liquid fuel injectors is reduced. Maximizing the time available for mixing and combustion while minimizing the number of liquid fuel injectors is most advantageous from cost and efficiency standpoints, particularly when accomplished in small gas turbines.

In recent annular combustors operating on the sidewinder technique, it is typical to have a plurality of air blast and/or air assist tubes circumferentially spaced about the combustor and normally located in the radially outer wall thereof. While air blast and air assist are somewhat similar, air blast generally has a higher velocity and is hotter than air assist. One end of each tube is open to the interior of the combustor while the opposite end is opened to the space between the radially outer wall of the combustor and the outer combustor case. As is known, this space is typically charged with compressed air from the compressor associated with the gas turbine engine. These tubes are directed tangentially into the annular combustion space of the combustor.

For liquid fuel injection purposes, liquid fuel injector tubes have typically been mounted within the air assist tubes and as a consequence liquid fuel atomization of liquid fuel injected from the tubes may be achieved as the liquid fuel is injected toward the combustion space in an associated air assist tube as the air passing though the air assist tube provides air atomization. As smaller and smaller combustors are designed, however, the diameter of the air assist tubes becomes commensurately reduced to the point where it is difficult to place the liquid fuel injector tubes inside the air assist tube.

Also, since the liquid fuel injector orifices or outlets are within the combustor, they are exposed to substantial heat. During normal operations, this does not present a problem since the flow of liquid fuel through the liquid fuel injector provides a cooling effect. Further, the propagation of combustion along with the flow of air serves to prevent undesirable overheating of the liquid fuel injectors. Once, however, operation ceases, neither liquid fuel nor air flows through the liquid fuel injector. Consequently, residual heat in the combustor area will cause elevation of the temperature of the liquid fuel injectors. In terms of the materials of which the liquid fuel injectors are constructed, this raising in temperature upon cessation of operation does not present a problem. The presence, however, of residual liquid fuel in the liquid fuel injector at such time will frequently cause a coking problem. Being carbonaceous in nature, such liquid fuel, upon being heated will begin to undergo a destructive distillation reaction and a coke-like and/or tarry residue will remain. Such a residue will quickly clog the liquid fuel injector and will result in improper operation during subsequent start-up.

SUMMARY OF THE INVENTION

In the present invention, the improved liquid fuel injector is provided with continuous air assist with both the liquid fuel injector tube and the surrounding air assist tube constrained or reduced in diameter at the discharge end thereof. The associated compressor provides combustion air to the combustor and air for continuous air assist with a separate air pump. The air assist air can be cooled in a heat exchanger either before, after, or before and after the separate air pump. The improved liquid fuel injector can be mounted within an annular air blast tube and directed at the inner wall of the combustor.

A solenoid valve controlled purge line, together with solenoid valves in the liquid fuel and air assist lines can be utilized to purge any liquid fuel in the liquid fuel injector and manifold upon shutdown of the combustor. The liquid fuel injector can also be insulated and liquid fuel can be used to cool the fuel injector.

BRIEF DESCRIPTION OF THE DRAWINGS

Figure 1:
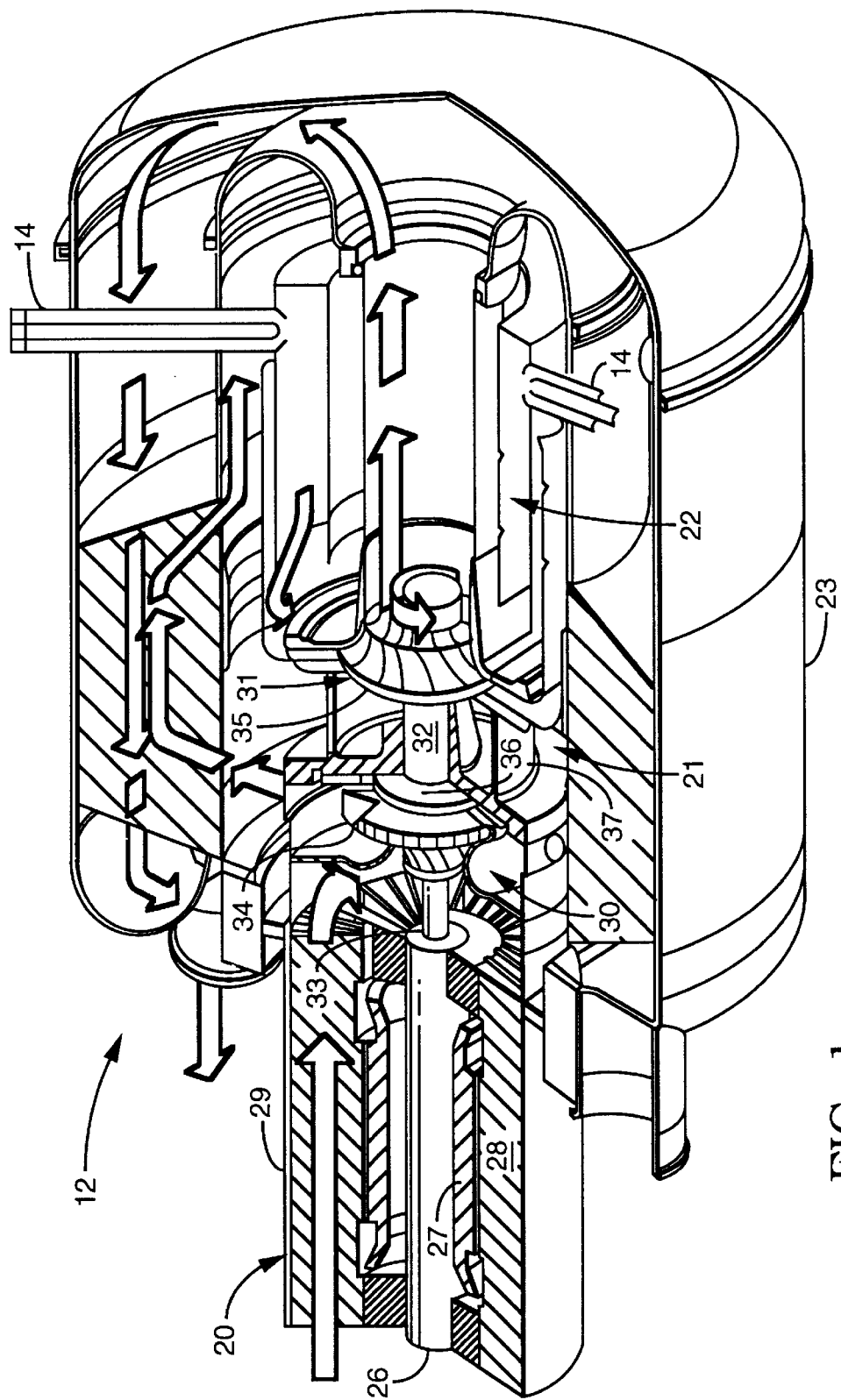
Figure 2:
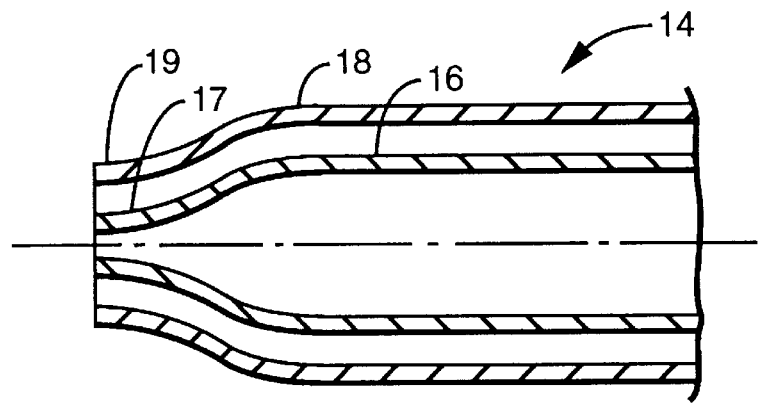
Figure 3:
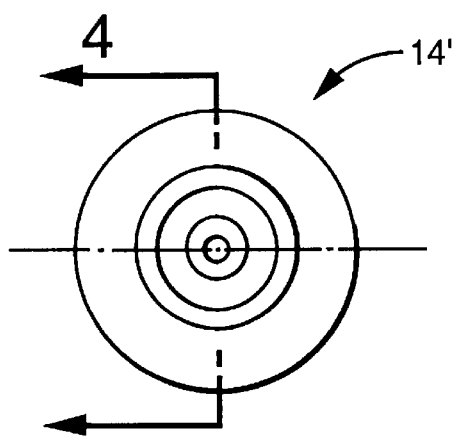
Figure 4:
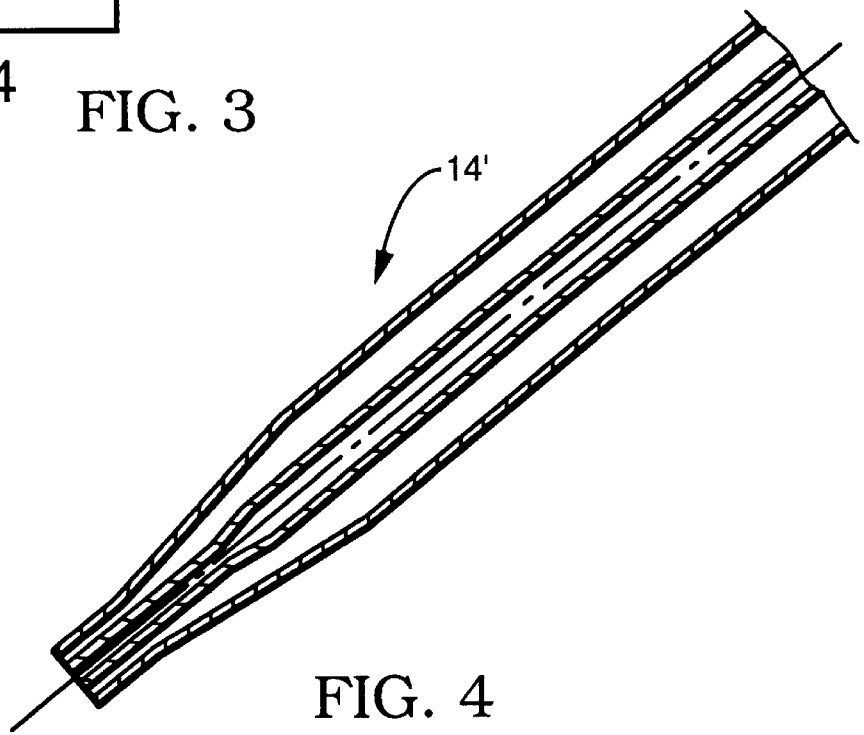
Figure 5:
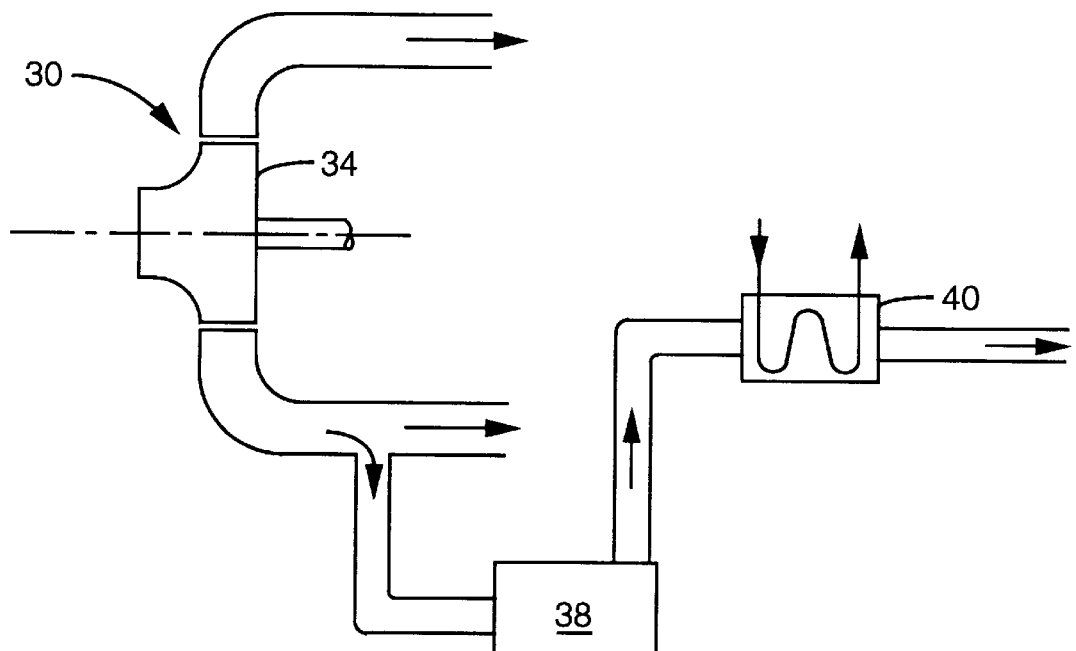
Figure 6:
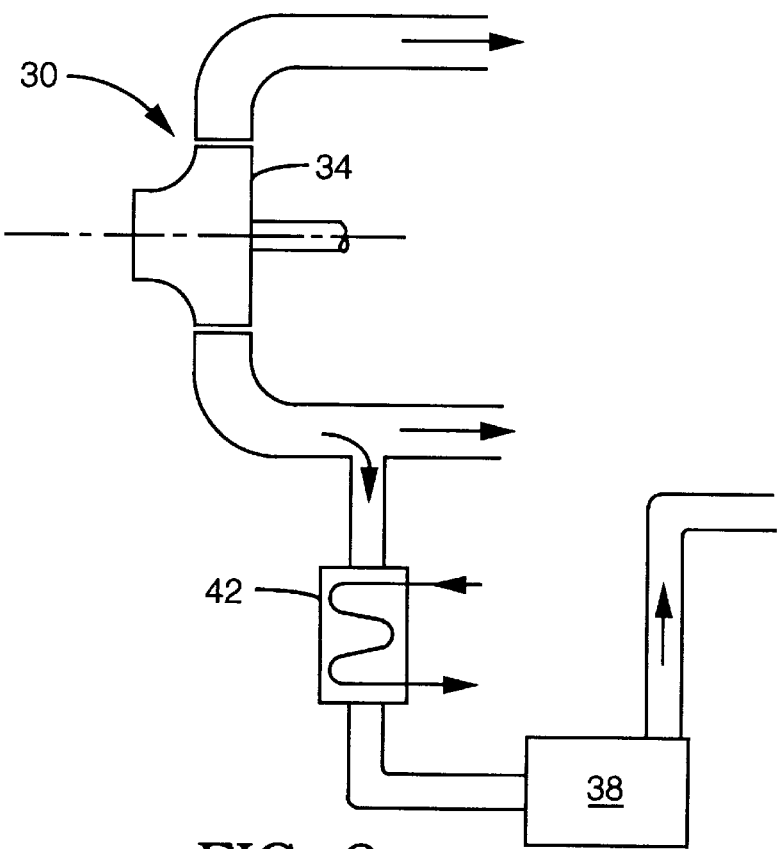
Figure 7:
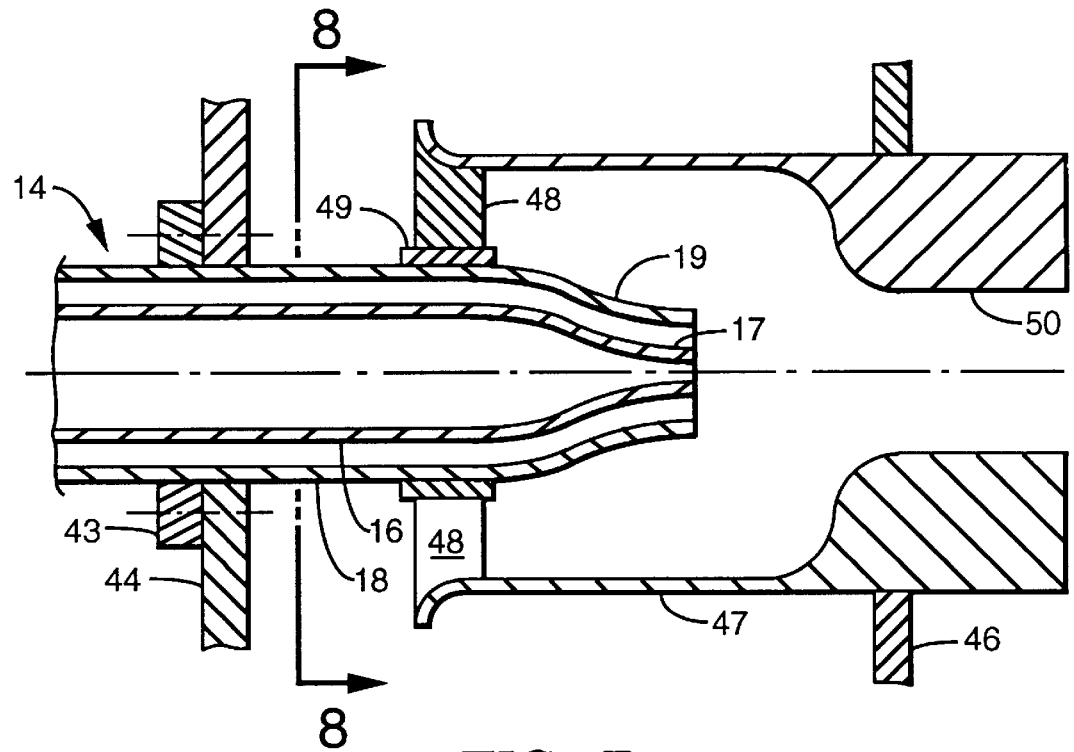
Figure 8:
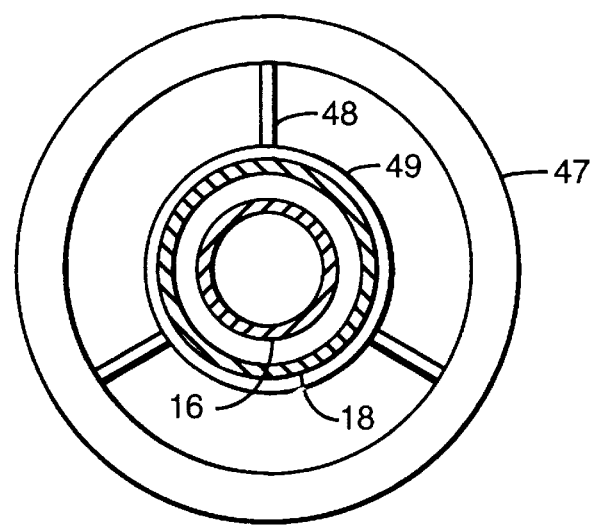
Figure 9:
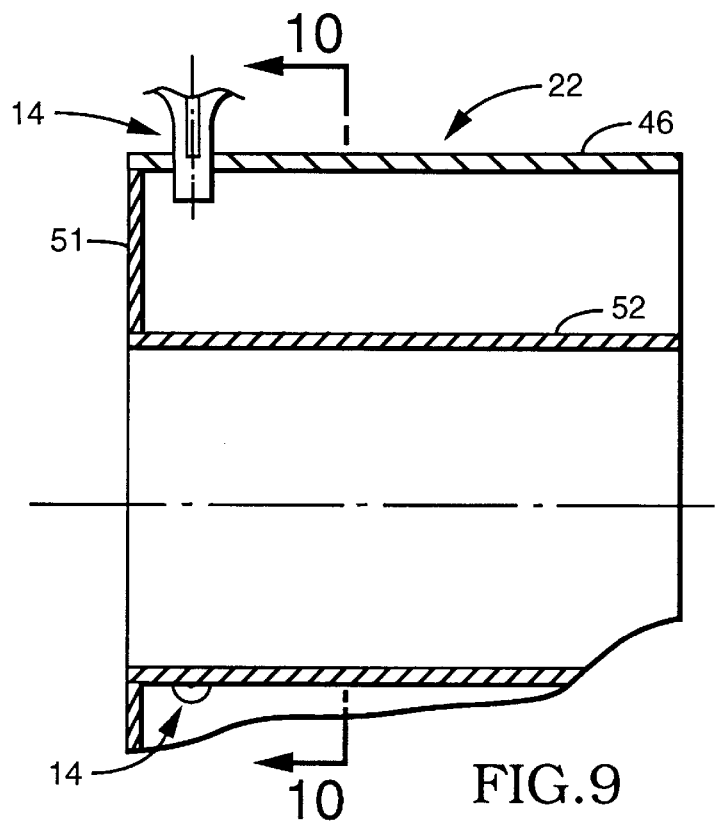
Figure 10:
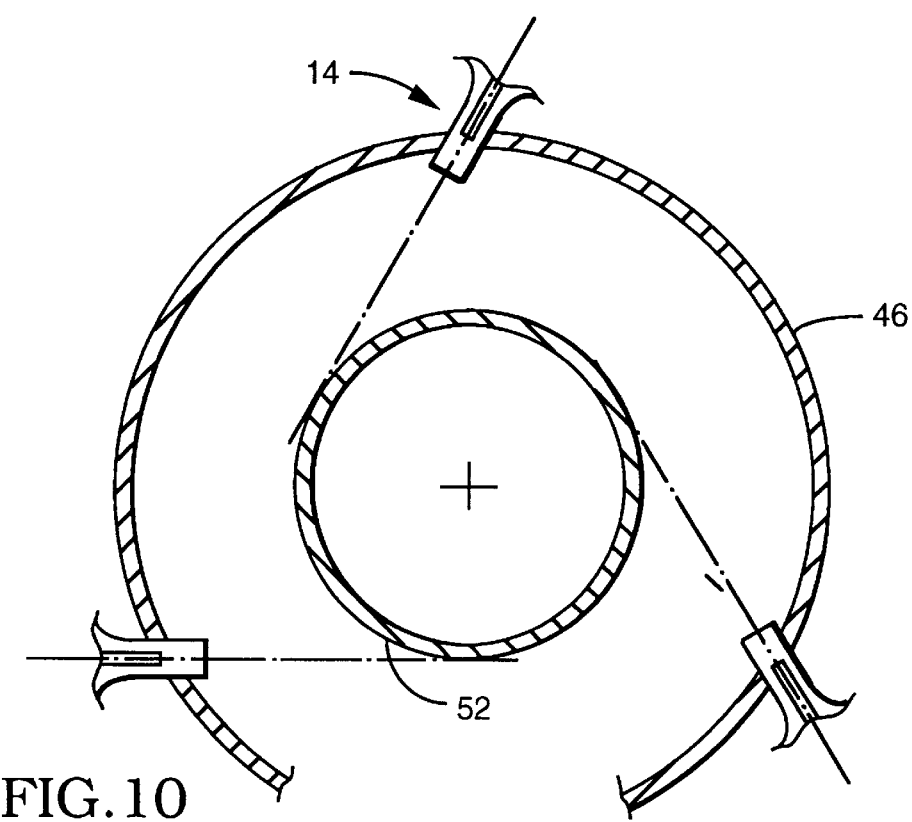
Figure 11:
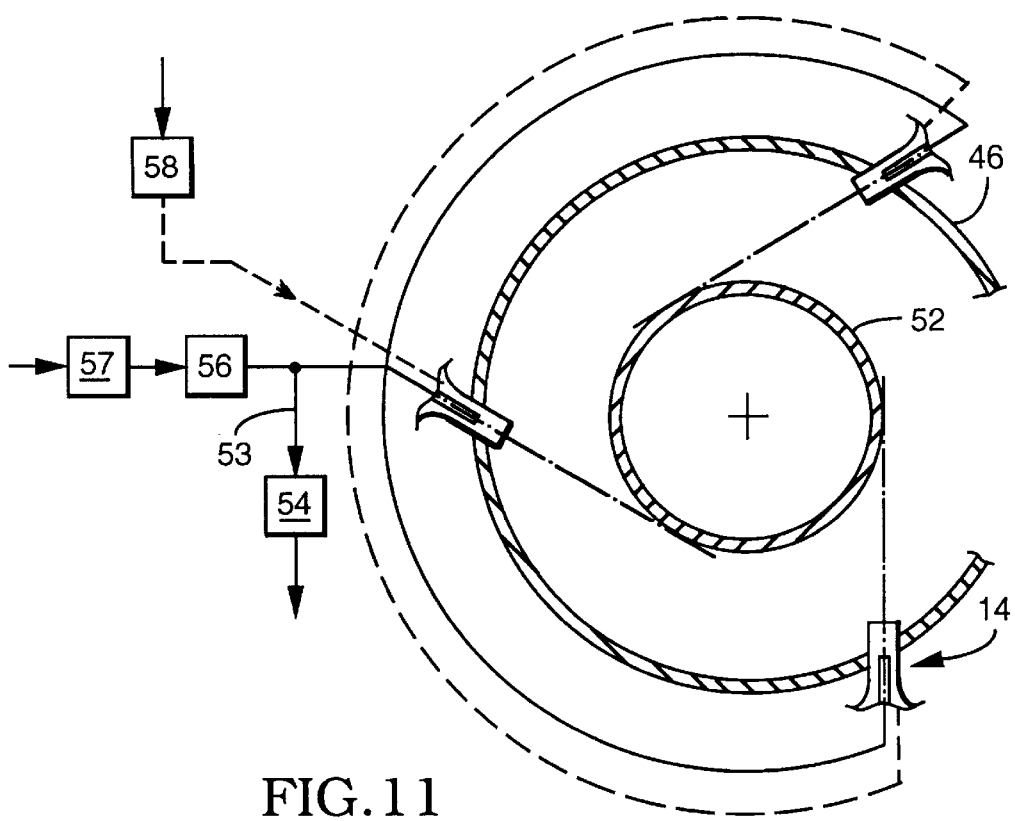
Figure 12:
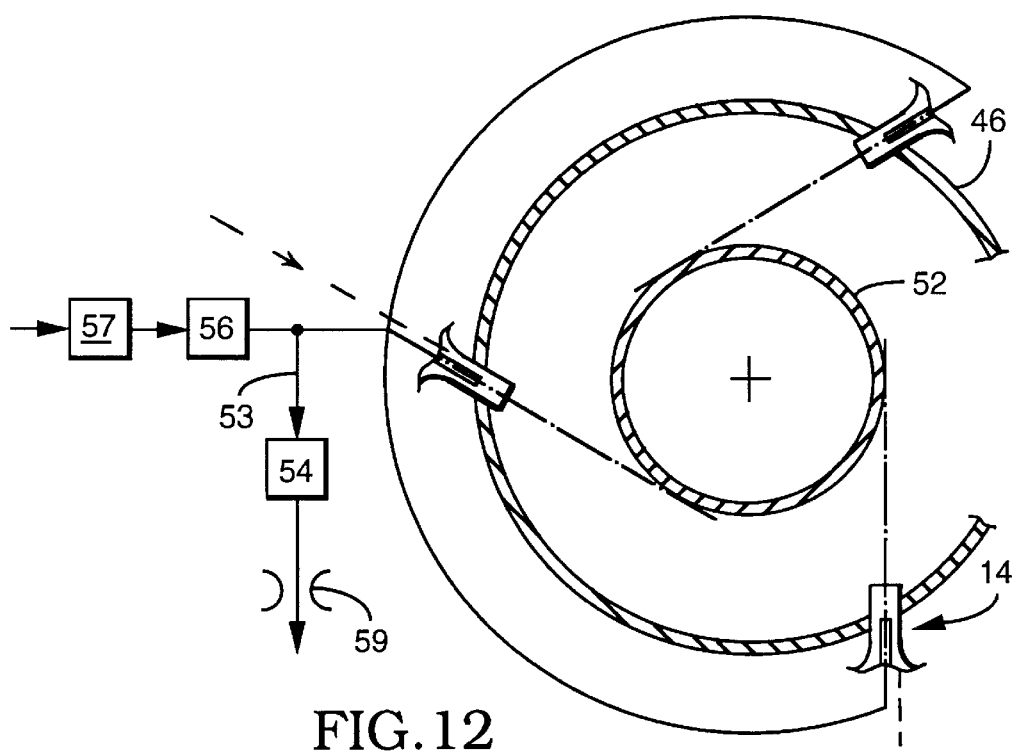
Figure 13:
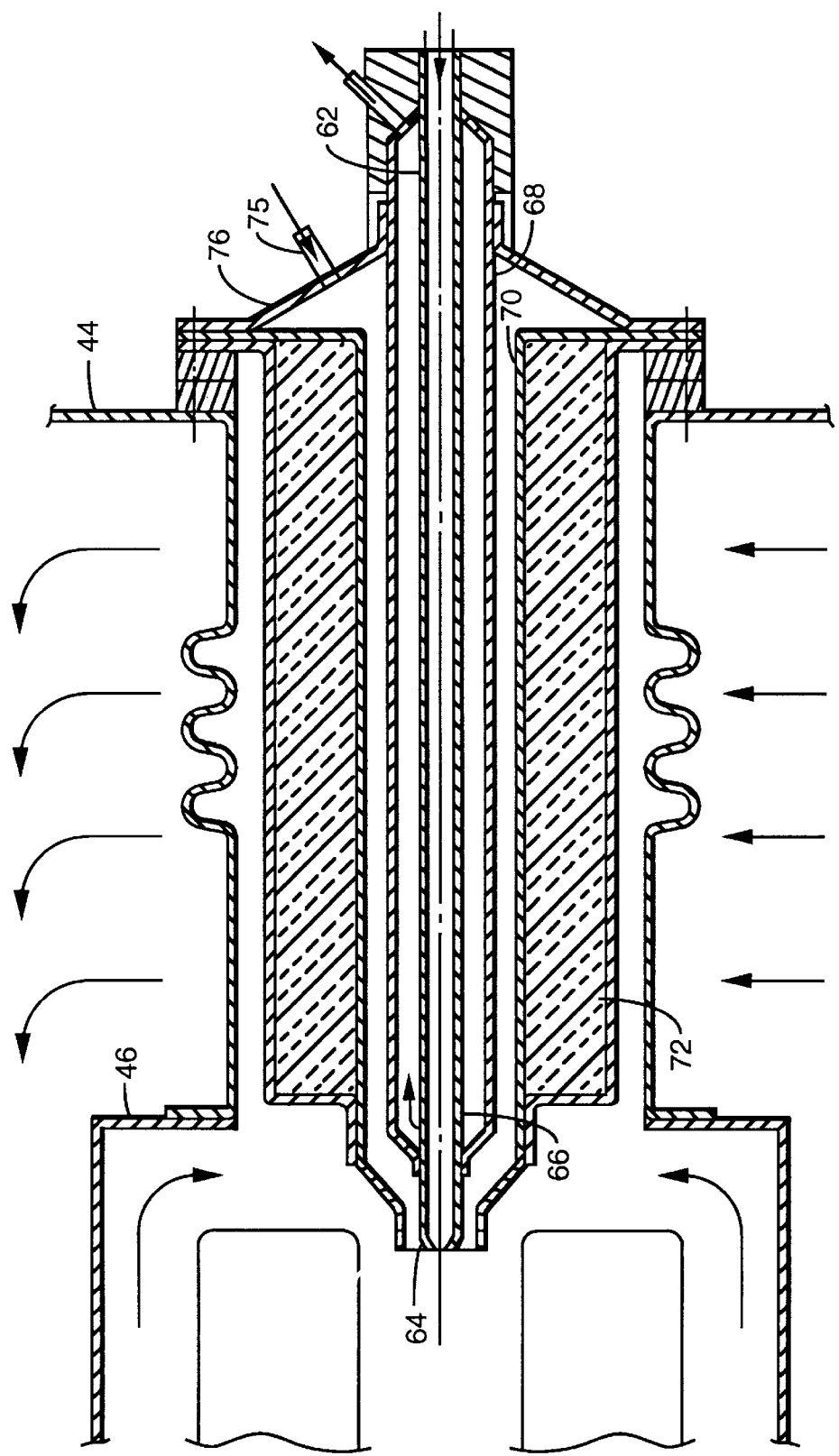

Having thus described the present invention in general terms, reference will now be made to the accompanying drawings in which:

FIG. 1 is a perspective view, partially cut away, of a turbogenerator utilizing the improved liquid fuel injector system of the present invention;

FIG. 2 is a sectional view of the improved liquid fuel injector of the present invention;

FIG. 3 is an end view of an alternate improved liquid fuel injector of the present invention;

FIG. 4 is a sectional view of the alternate improved liquid fuel injector of FIG. 3 taken along line 4—4 of FIG. 3, FIG. 5 is a block diagram, partially schematic view of a continuous air assist cooling system for the improved liquid fuel injector of FIGS. 2–4;

FIG. 6 is a block diagram, partially schematic view of an alternate continuous air assist cooling system for the improved liquid fuel injector of FIGS. 2–4;

FIG. 7 is a sectional view of the improved liquid fuel injector of the present invention mounted in the combustor casing;

FIG. 8 is a cross sectional view of the mounted improved liquid fuel injector of FIG. 7 taken along line 8—8;

FIG. 9 is a schematic view of an annular combustor having the improved liquid fuel injector of FIGS. 2–8;

FIG. 10 is a cross sectional view of the annular combustor of FIG. 9 taken along line 10—10;

FIG. 11 is a schematic view of a liquid fuel purge system for improved liquid fuel injector of FIGS. 2–10;

FIG. 12 is a schematic view of an alternate liquid fuel purge system for the improved liquid fuel injector of FIGS. 2–10; and FIG. 13 is a schematic view of an insulated improved liquid fuel injector of the present invention.

DETAILED DESCRIPTION OF THE PREFERRED EMBODIMENTS

A turbogenerator 12 utilizing the liquid fuel injector system of the present invention is illustrated in FIG. 1. The turbogenerator 12 generally comprises a permanent magnet generator 20, a power head 21, a combustor 22 and a recuperator (or heat exchanger) 23.

The permanent magnet generator 20 includes a permanent magnet rotor or sleeve 26, having a permanent magnet disposed therein, rotatably supported within a permanent magnet generator stator 27 by a pair of spaced journal bearings. Radial permanent magnet generator stator cooling fins 28 are enclosed in an outer cylindrical sleeve 29 to form an annular air flow passage which cools the permanent magnet generator stator 27 and thereby preheats the air passing through on its way to the power head 21.

The power head 21 of the turbogenerator 12 includes compressor 30, turbine 31, and bearing rotor 32 through which the tie rod 33 to the permanent magnet rotor 26 passes. The compressor 30, having compressor impeller or wheel 34 which receives preheated air from the annular air flow passage in cylindrical sleeve 29 around the permanent magnet generator stator 27, is driven by the turbine 31 having turbine wheel 35 which receives heated exhaust gases from the combustor 22 supplied with preheated air from recuperator 23. The compressor wheel 34 and turbine wheel 35 are supported on a bearing shaft or rotor 32 having a radially extending bearing rotor thrust disk 36. The bearing rotor 32 is rotatably supported by a single journal bearing within the center bearing housing 37 while the bearing rotor thrust disk 36 at the compressor end of the bearing rotor 32 is rotatably supported by a bilateral thrust bearing.

Intake air is drawn through the permanent magnet generator 20 by the compressor 30 which increases the pressure of the air and forces it into the recuperator 23. In the recuperator 23, exhaust heat from the turbine 31 is used to preheat the air before it enters the combustor 22 where the preheated air is mixed with liquid fuel and burned. The combustion gases are then expanded in the turbine 31 which drives the compressor 30 and the permanent magnet rotor 26 of the permanent magnet generator 20 which is mounted on the same shaft as the turbine 31. The expanded turbine exhaust gases are then passed through the recuperator 23 before being discharged from the turbogenerator 12.

The turbogenerator 12 is able to operate on whatever liquid fuel is available. Ignition of the liquid fuel from the liquid fuel injectors 14 produces heat and the liquid fuel flow is sustained and accelerates the turbogenerator which raises the pressure of the turbogenerator compressor 30. As the turbogenerator compressor 30 increases the pressure of the combustion air, the liquid fuel pressure must be correspondingly increased to keep it somewhat higher so that there is a positive flow; of liquid fuel to the combustor injectors.

The liquid fuel injectors 14 of the present invention are illustrated in more detail in FIGS. 2–4. As generally shown in FIG. 1, the combustor 22 includes a plurality of liquid fuel injectors 14 spaced around the annular periphery thereof.

The liquid fuel pressure at the lowest liquid fuel injector 14 will be higher than the liquid fuel pressure at the highest liquid fuel injector 14 by an amount "$\varrho$" times "h", where "$\varrho$" is liquid fuel density and "h" is the vertical distance between the lowest liquid fuel injector 14 and the highest liquid fuel injector 14. In order to compensate for this manifold head effect, the liquid fuel injector tube 16 can be swaged down to a smaller diameter discharge end 17. In addition, the concentrically arranged air assist tube 18 can also be swaged down correspondingly to a smaller diameter discharge end 19. This will produce a liquid fuel pressure drop which only partly compensates for manifold head. The application of liquid fuel back pressure is particularly advantageous in reducing vapor lock when volatile liquid fuels such as gasoline are utilized.

Without the swaged smaller diameter discharge end 17 on the liquid fuel injector tube 16, orifices might otherwise have to be utilized in the liquid fuel injector tube 16 to take a significant pressure drop such that the liquid fuel pressure times "h" would create only minor liquid fuel maldistributions. In a small gas turbine engine, the resulting orifice would be very small, costly and prone to plugging up and liquid fuel pressure would be very high which could cause cost and reliability problems. For example, in a small gas turbine on the order of 24 kW with a manifold head of 8 inches, the orifice size would be only 0.003 inches and the maximum liquid fuel pressure at fuel power would be a very high 1500 psi.

The air assist air pressure in the improved liquid fuel injector 14 would be on the order of several psi and would accelerate the liquid fuel jet from the liquid fuel injector tube 16. This would also serve to compensate for the manifold head effect. At the same time liquid fuel pressure would be relatively low and the liquid fuel injector tube discharge end opening would be relatively large when compared to an internal orifice.

As illustrated in FIGS. 5 and 6, a small air pump 38 driven at more or less constant speed by one of a variety of means such as an electric motor, gear box, etc., (not shown) can be provided. The air pump 38 most conveniently can use compressed air tapped off of the gas turbine compressor 30. This will minimize the size of the air pump 38 and its power requirements. FIG. 5 shows the air assist air cooled by a liquid fuel or air heat exchanger 40 before the air is supplied to the liquid fuel injectors 14. As an alternative shown in FIG. 6, the air assist air may be cooled in a liquid fuel or air heat exchanger 42 before the air pump 28.

Cooling the air assist air is advantageous in helping to cool the liquid fuel injectors 14. It should be appreciated that in a small annular combustor, particularly of the recuperated type, the liquid fuel flow would, at no load, be extremely low. The problem is made worse since the liquid fuel needs to be shared amongst several liquid fuel injectors 14. There simply is no practical liquid fuel injector that can satisfactorily atomize the liquid fuel at these low liquid fuel flow rates, for example, on the order of 2½ pounds per hour at no load. By keeping the air pump in continuous operation, the liquid fuel can be well atomized by a simple means.

Combustion of liquid fuels is highly dependent on effective atomization to achieve high rates of mixing and evaporation. Decreasing liquid fuel droplet size out of the liquid fuel injectors 14 will result in faster evaporation which translates into easier ignition, a wider burning range, improved mixing, and reduced pollutant emissions.

Moreover, a recuperated gas turbine engine has a vast range of operating conditions. Thus, in a cold start the air temperature entering the combustor, at full load, could be quite low, say around 400 degrees Fahrenheit, but when filly warmed up the air temperature can be as high as 1,100 degrees Fahrenheit. For a typical recuperated small gas turbine engine, the respective liquid fuel flows could be greater than 38 pounds per hour to about 15½ pounds per hour, respectively. With perhaps a design point hot pressure drop of 3%, then the cold design point pressure drop would be only about 1.6%. Hence when operating cold, the pressure drop would not be sufficient for satisfactory liquid fuel atomization if conventional liquid fuel atomizers were employed. Continuous air assist from the air pump 38 can solve this problem.

As shown in FIGS. 7 and 8, the liquid fuel injectors 14 can be mounted through flange 43 in the combustor case 44 and slidably mounted in an air blast tube 47 which extends through the outer combustor case 46. The support sleeve 49 in the spider support 48 of the air blast tube 47 provides a sliding fit for the liquid fuel injector 14. The liquid fuel injector 14 is mounted somewhat upstream of the exit orifice 50 of the air blast tube 47 in a strongly accelerating airflow. Hence there are no damaging wakes from the liquid fuel injector 14 that might otherwise enter the combustor 22. The combustor pressure drop derives air from outside the combustor 22, through the air blast tube exit orifice 50 at a high air velocity of several hundred feet per second. Thus, this air is thoroughly mixed with the well atomized liquid fuel/assist air mixture which is most advantageous for good combustion.

FIGS. 9 and 10 illustrate the liquid fuel injectors 14 mounted in near proximity to the combustor dome 51 and directed so that the liquid fuel/air jets emanating from these liquid fuel injectors 14 are directed to flow more or less tangentially towards the combustor inner wall 52 and thus aiming at the next liquid fuel injector 14. It is very desirable to minimize the number of liquid fuel injectors and the above arrangement enables this to be accomplished.

In this instance, the combustor is made considerable larger than would otherwise be common practice. A common sizing measure for a combustor is BTU per cubic feet hour atmosphere. A typical combustor might achieve a value of 6 times $10^6$ or more. The combustors of the present invention have a value of 0.6 times $10^6$ or even less, i.e. a factor of ten times larger than a combustor with conventional practice. By this means the combustor of FIGS. 9 and 10 can operate most satisfactorily while using only 3 liquid fuel injectors which is a considerable advance over the current practice.

FIGS. 11 and 12 illustrate the combustor of FIGS. 9 and 10 with a liquid fuel injector purge system. In FIG. 11, the liquid fuel line includes a liquid fuel control valve 57 and a liquid fuel on/off solenoid valve 56. The air assist line or conduit (shown as a dashed line) includes an air assist solenoid valve 58. In addition, a purge line 53 with a purge line solenoid valve 54 is provided from the liquid fuel line downstream of the liquid fuel on/off solenoid valve 56.

At engine shutdown, the air pressure inside the combustor would ordinarily, depending upon engine speed and load, be from 29 psia and upwards. In order to purge the liquid fuel injectors 14, the purge line solenoid valve 54 is opened and both the liquid fuel on/off solenoid valve 56 and air assist solenoid valve 58 are closed. The back pressure from the circa 29 psi pressure in the combustor will back flow the liquid fuel out of the liquid fuel manifold and overboard through the liquid fuel purge line 53. It is critical that the air assist solenoid valve be off to prevent the liquid fuel in the liquid fuel manifold from being sucked into the gas turbine engine at an uncontrolled rate which could cause damaging explosions.

Alternately, as shown in FIG. 12, a restrictive orifice 59 can be included in the purge line 53 after the purge line solenoid valve 54 and the air assist solenoid valve can be eliminated. In this instance, with the liquid fuel solenoid valve 56 closed and the purge line solenoid valve 54 open, the liquid fuel in the manifold will be sucked out at a controlled rate by virtue of the restrictive orifice 59 in the liquid fuel purge line 53.

The liquid fuel injector system of FIG. 13 is designed to cool the liquid fuel and thus prevent vapor lock in the combustor when a liquid fuel such as gasoline is utilized. The liquid fuel injector tube 62 can include a liquid fuel spill orifice 66 near the smaller diameter discharge end 64 to permit excess liquid fuel to spill into a concentric spill tube 68 which also serves as the inner wall of the air assist tube 70. The exterior of the air assist tube 70 is insulated with insulation 72. The air assist inlet 75 to the air assist tube 70 is provided in the sheet metal support 76 which serves to thermally isolate the liquid fuel injector 14.

The improved liquid fuel injector and system described above can achieve significant advantages over conventional liquid fuel injectors and systems. Not only are the number of individual liquid fuel injectors minimized but their construction and placement result in improved performance and eliminate many of the difficulties with prior systems.

While specific embodiments of the invention have been illustrated and described, it is to be understood that these are provided by way of example only and that the invention is not to be construed as being limited thereto but only by the proper scope of the following claims.

What we claim is:

1. A liquid fuel injector purge system for a gas turbine engine, comprising:

an annular combustor having an outer wall, an inner wall, a closed upstream end, and an open discharge end;

a plurality of liquid fuel injectors spaced around the periphery of the closed end of said combustor to direct liquid fuel/air into said combustor;

a liquid fuel inlet conduit to each of said plurality of liquid fuel injectors, said liquid fuel inlet conduit having a liquid fuel control valve and a liquid fuel on/off solenoid valve;

an air assist conduit to each of said plurality of liquid fuel injectors, and a liquid fuel purge conduit extending from said liquid fuel conduit, disposed between said liquid fuel on/off solenoid valve and said plurality of liquid fuel injectors, and having a purge line solenoid valve and a restrictive orifice, so that when said gas turbine engine is shut down and said liquid fuel inlet or/off solenoid valve is closed, liquid fuel is sucked through the liquid fuel purge line restrictive orifice with the liquid fuel purge line solenoid valve open.

2. The liquid fuel injector purge system of claim 1 wherein each of said liquid fuel injectors generally directs fuel/air tangentially towards the inner wall of said combustor.

3. The liquid fuel injector purge system of claim 1 wherein each of said plurality of liquid fuel injectors comprise:

a cylindrical liquid fuel tube having a reduced diameter discharge end; and a cylindrical air assist tube concentrically disposed around said cylindrical liquid fuel tube and having a reduced diameter discharge end disposed around the reduced diameter discharge end of said cylindrical liquid fuel tube.

4. The liquid fuel injector purge system of claim 3 wherein the exterior of said cylindrical air assist tube is insulated.

5. The liquid fuel injector purge system of claim 3 wherein each of said plurality of liquid fuel injectors additionally includes a cylindrical air blast tube disposed around the reduced diameter discharge ends of said cylindrical liquid fuel tube and said cylindrical air assist tube and having a plurality of radial spider supports extending from said air blast tube to support the reduced diameter discharge end of said cylindrical air assist tube.

6. The liquid fuel injector purge system of claim 3 wherein said air assist conduit to continuously deliver compressed air from the gas turbine engine compressor to said cylindrical air assist tube during operation of said liquid fuel combustion system includes a pump disposed in said air assist conduit to raise the pressure of the compressed air delivered to said air assist tube.

7. The liquid fuel injector purge system of claim 6 and in addition a heat exchanger in said air assist conduit upstream of said pump to remove heat from said compressed air.

8. The liquid fuel injector purge system of claim 6 and in addition a heat exchanger in said air assist conduit downstream of said pump to remove heat from said pumped compressed air.

9. A liquid fuel injector purge system for a gas turbine engine, comprising:

an annular combustor having an outer wall, an inner wall, a closed upstream end, and an open discharge end;

a plurality of liquid fuel injectors spaced around the periphery of the closed end of said combustor to direct liquid fuel/air tangentially towards the inner wall of said combustor, each of said plurality of liquid fuel injectors including a cylindrical liquid fuel tube having a reduced diameter discharge end, a cylindrical air assist tube concentrically disposed around said cylindrical liquid fuel tube and having a reduced diameter discharge end disposed around the reduced diameter discharge end of said cylindrical liquid fuel tube, and a cylindrical air blast tube disposed around the reduced diameter discharge ends of said cylindrical liquid fuel tube and said cylindrical air assist tube and having a plurality of radial spider supports extending from said air blast tube to support the reduced diameter discharge end of said cylindrical air assist tube;

a liquid fuel inlet conduit to each of said plurality of liquid fuel injectors, said liquid fuel inlet conduit having a liquid fuel control valve and a liquid fuel on/off solenoid valve;

an air assist conduit to each of said plurality of liquid fuel injectors; and a liquid fuel purge conduit extending from said liquid fuel conduit, disposed between said liquid fuel on/off solenoid valve and said plurality of liquid fuel injectors, and having a purge line solenoid valve and a restrictive orifice, so that when said gas turbine engine is shut down and said liquid fuel inlet on/off solenoid valve is closed, liquid fuel is purged through said liquid fuel purge line restrictive orifice with the liquid fuel line solenoid valve open.

10. The liquid fuel injector purge system of claim 9 wherein said air assist conduit to continuously deliver compressed air from the gas turbine engine compressor to said cylindrical air assist tube during operation of said liquid fuel combustion system includes a pump disposed in said conduit to raise the pressure of the compressed air delivered to said air assist tube.

11. The liquid fuel injector purge system of claim 10 and in addition a heat exchanger in said air assist conduit upstream of said pump to remove heat from said compressed air.

12. The liquid fuel injector purge system of claim 10 and in addition a heat exchanger in said air assist conduit downstream of said pump to remove heat from said compressed air.

* * * * *

UNITED STATES PATENT AND TRADEMARK OFFICE
CERTIFICATE OF CORRECTION

PATENT NO : 6,065,281
DATED : May 23, 2000
INVENTOR(S) : Jack R. Shekleton et al.

It is certified that error appears in the above-identified patent and that said Letters Patent are hereby corrected as shown below:

```
Title page, item [54] and col. 1,
```
TITLE, change to "LIQUID FUEL INJECTOR AND INJECTOR PURGE SYSTEM
Column 1, line 6-7, change "5,966,426" to --5,966,926--
Column 4, line 2, change "," to --;--
Column 5, line 13, change "flow; of" to --flow of--

Signed and Sealed this

Tenth Day of April, 2001

Attest:

NICHOLAS P. GODICI

Attesting Officer     Acting Director of the United States Patent and Trademark Office